Figure 1:
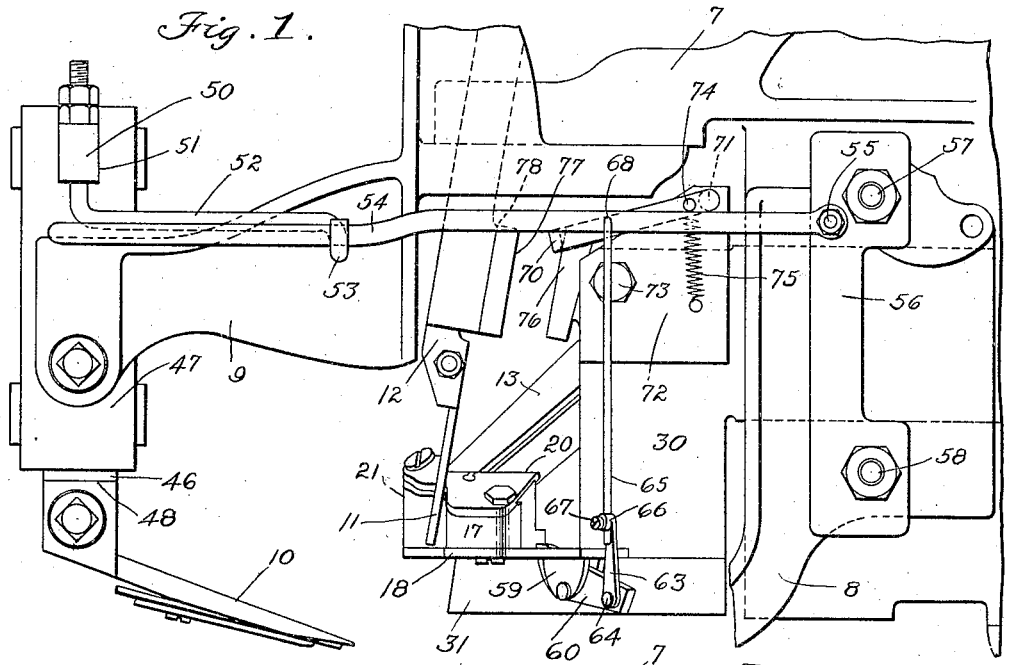

Sept. 27, 1927.　　　　D. MacARTHUR　　　　1,643,389
ECONOMIZER FOR FASTENING INSERTING MACHINES
Original Filed April 12, 1919　　2 Sheets-Sheet 1

Inventor
David MacArthur
by [Attorneys signature]
Attorneys

Sept. 27, 1927.  
D. MacARTHUR  
1,643,389  
ECONOMIZER FOR FASTENING INSERTING MACHINES  
Original Filed April 12, 1919   2 Sheets-Sheet 2
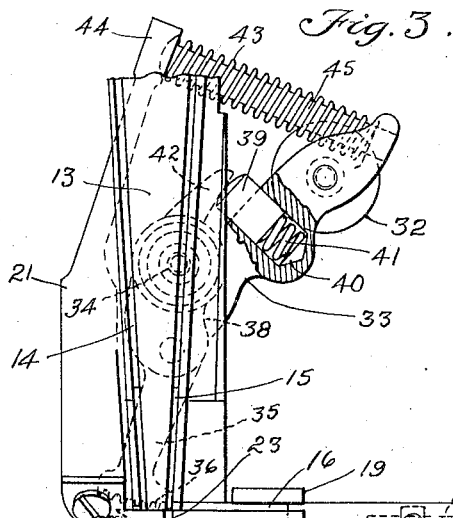
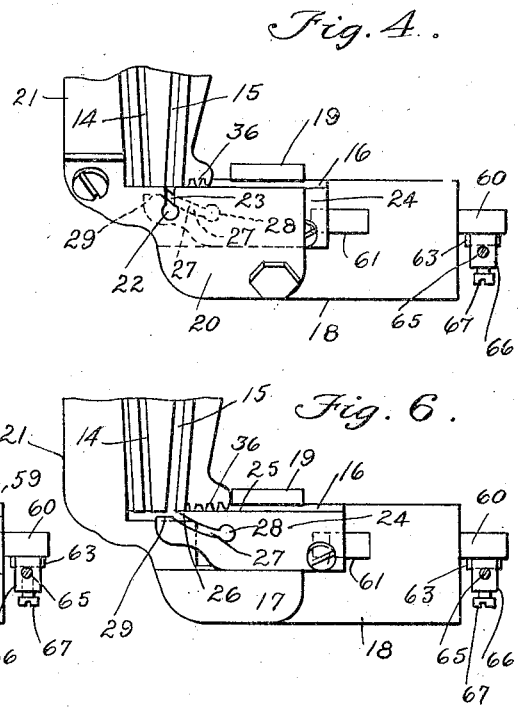
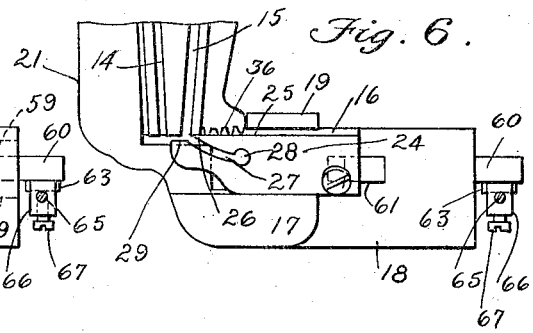
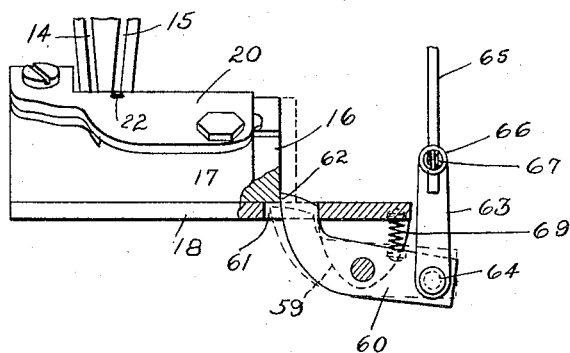
Inventor  
David MacArthur  
by *[signature]*  
Attorneys Patented Sept. 27, 1927.

1,643,389

UNITED STATES PATENT OFFICE.

DAVID MacARTHUR, OF HARRISBURG, PENNSYLVANIA, ASSIGNOR TO UNITED SHOE MACHINERY CORPORATION, OF PATERSON, NEW JERSEY, A CORPORATION OF NEW JERSEY.

ECONOMIZER FOR FASTENING-INSERTING MACHINES.

Application filed April 12, 1919, Serial No. 289,692. Renewed November 30, 1923.

This invention relates to machines for inserting fastenings for the purpose, for example, of securing together the parts of boots and shoes. More particularly, the invention relates to power driven machines equipped with fastening supplying and inserting mechanism which, after being started, continue to operate through repeated cycles until stopped by the operator. An object of the invention is to economize fastening material by preventing waste in case the machine is allowed to run with no work presented to it.

The embodiment of the invention selected for illustration is herein shown and described as incorporated in a machine used in the art of shoemaking and known commercially as the consolidated hand method lasting machine, but it is to be understood that various features of the invention are not limited to embodiment in this type of machine.

A lasting machine of the above-mentioned type is treadle-controlled and remains in continuous operation through the repeated cycles as long as the operator holds the treadle depressed. If the operator then, as is a usual practice, does not release the treadle after a shoe is finished and while he is disposing of that shoe and securing another to present to the machine, the machine will go through a number of cycles idly, a tack being expelled from the tack holder in each cycle and falling to the floor.

Various mechanisms have been devised for preventing this waste of tacks. For instance, in one such mechanism the driver is normally locked against movement, and power means rendered operative by the presence of the shoe is provided to unlock the driver to permit its operation. Since the time in which the machine is usefully employed will, under normal conditions, be greatly in excess of the time in which it is running idle, it is highly desirable and is an object of this invention that the machine, when usefully employed, should utilize only the mechanism usually provided, the mechanism for preventing waste of tacks coming into action only when the machine is running idle. The wear on the parts is thus reduced and the operation of the machine while performing its work is entirely unaffected.

Accordingly a feature of the invention consists in power operated means acting to render the fastening inserting means functionless when no work is presented to the machine while it is still running. The illustrated organization comprises means for supplying fastening material, reciprocating means for inserting fastenings, and means, acting in response to presentation and withdrawal of the work-piece, to render the supplying and reciprocating inserting means operative and inoperative to insert fastening material while the reciprocating means continues to reciprocate. As herein illustrated, means operated by power of the machine acts in response to withdrawal of the work-piece to render the reciprocating tack driver inoperative or functionless to insert tacks while the driver continues to reciprocate.

In this construction instrumentalities are provided for supplying fastenings and inserting the fastenings, and if either of these instrumentalities is rendered functionless no fastening will be inserted. Accordingly a further feature of the invention consists in a plurality of instrumentalities operating in predetermined time relation through repeated cycles to insert fastenings into a work-piece, and power means acting automatically to render one of said instrumentalities functionless when no work-piece is being presented to the machine and the machine continues to run. As shown herein, the machine is provided with tack supplying mechanism, tack inserting means and power means rendered operative in response to removal of the work to prevent a tack from being expelled from the supplying mechanism and wasted. In another view the power means which operates when the machine is running idle to prevent effective action of the inserting means is rendered inoperative by presentation of the work and the fastening inserting means therefore is permitted to function. A simple and effective manner of applying this invention to the hand method machine is to utilize the tack carrier slide as the source of power for operating a displacer which is movably mounted on the slide and which, through connection with a work rest, is held out of operative position when work is presented to the machine. When no work is presented, however, the displacer is automatically positioned to engage a member in which the tack driver reciprocates and moves that member to cause reciprocation of the driver in a path, which path does not coincide with the presented tack, and hence no tack is driven but the separated tack remains in the tack holder ready to be inserted by the first reciprocation of the driver after it is permitted to resume its function by its presentation to the work.

Figure 2:
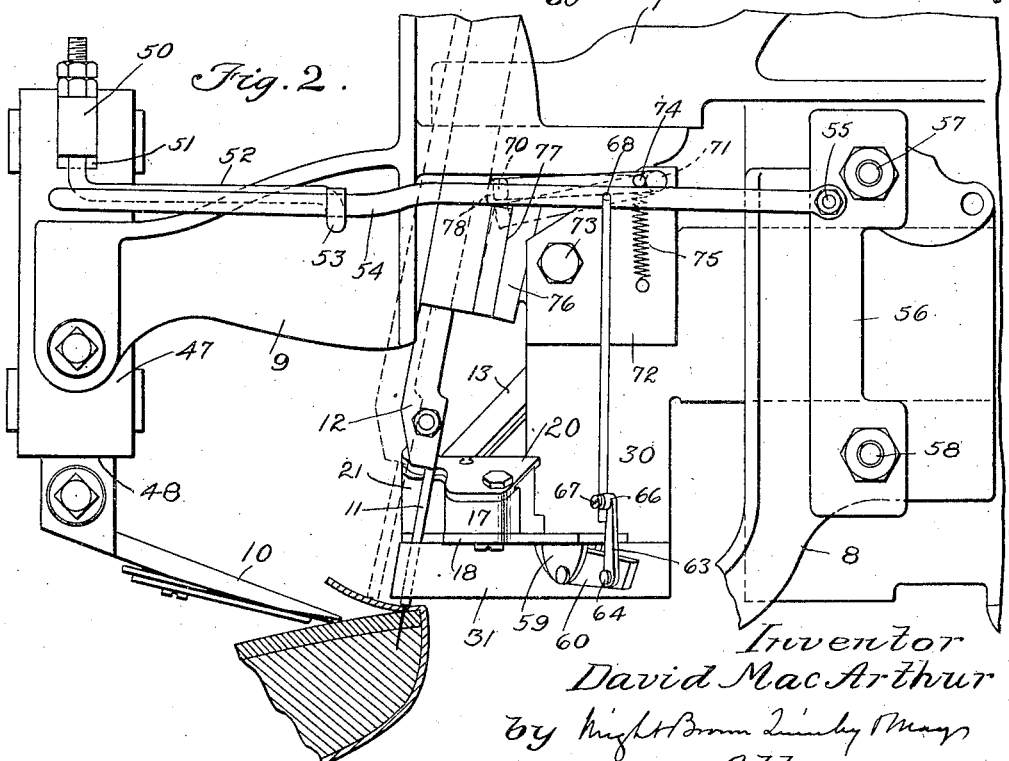

In the drawings I have shown, and in the following specification I will describe, only so much of the lasting machine as is necessary to explain the manner in which the particular embodiment of the invention here illustrated is applied thereto, describing, however, in complete detail all the parts, and their co-operative relation, of such embodiment. If further information is needed as to the construction of the lasting machine itself, reference may be had to Letters Patent of the United States No. 584,744, granted June 15, 1897, on application of Ladd and McFeely, and subsequent patents containing improvements on machines of the type there shown. Machines of the type disclosed in said patent are in wide commercial use at the present time and it is to a machine of this type that the present invention is shown as applied. In the drawing, Figure 1 is a side elevation of that part of the lasting machine to which the invention is applied, showing the tack supplying and inserting mechanism in the condition they are caused to assume by the construction embodying my invention when the shoe is not in position to be acted upon. Figure 2 is a similar view showing the same parts in the condition assumed when a shoe is presented to be lasted. Figure 3 is a plan view of the tack-feeding means and of the stop which I have provided as a part of this invention for preventing operation thereof. Figure 4 is a view similar to Figure 3 illustrating the mode of action of said stop. Figure 5 is a front elevation, with parts broken away and shown in section of the mechanism in the same position as illustrated in Figure 4. Figure 6 is a plan view similar to the Figures 3 and 4 but showing the fastening feeding mechanism in a different position and the stop therefor rendered inoperative by placing the shoe in position to be worked on.

The same reference characters indicate the same parts in all the figures.

Referring now to these drawings 7 and 8 represent parts of the rigid frame of the lasting machine, 9 represents a bracket projecting at the front end of the machine and 10 represents a rest which is supported by the bracket 9 and is provided to steady a shoe being lasted, the operator holding the shoe so that its bottom bears against the rest when presenting the edges of the upper to be grasped and tensioned by the grippers and to receive tacks. 11 is a tack driver and 12 the driver bar which carries it, this bar being alternately raised and driven downward by mechanism with which the machine is provided, and being also hinged or swiveled so that it can swing in a vertical plane extending from front to rear of the machine, that is, from left to right and the reverse with respect to Figures 1 and 2. 13 is a raceway provided with two tack channels 14 and 15 adapted to conduct tacks of different lengths from hoppers or magazines, and 16 is a feeder for the tacks, usually called a separator, which is mounted in a guideway comprised by a front wall 17, a bottom plate 18, a rear lug 19 on said plate, and a cover plate 20. The plate 18 is secured to an arm or holder 21 which supports the raceway, the raceway guide and the separator. The cover 20 and bottom plate 18 have a tack passage 22 and the cover 20 has a rear entrance channel 23 with which the outlet of either raceway channel is adapted to be brought in register, and the separator is constructed and operated to pick the tacks one by one from the registering channel and transfer them into the passage 22. To do this the separator is equipped with a plate 24 having an edge 25 which travels close to the end of the raceway and terminates in a picker point 26, from which an inclined slot 27 leads to a hole 28 large enough to admit the tack head and adapted to be registered with the passage 22. At the opposite side of the slot 27 from the picker point the plate 24 is formed with an abutment 29 which arrests the forward tack in the raceway when its shank is advanced far enough to permit the picker point 26 to pass behind it. In the normal action of the machine the separator is moved back and forth, and in each traverse to the left, with respect to Figures 3 to 6, it transfers the endmost tack from the raceway to the passage 22.

30 represents a slide or carriage adapted to reciprocate left and right, with respect to Figures 1 and 2, on the machine frame, and carrying a tack holder 31 which projects beneath the plate 18 and is provided with a tack passage, at each side of which are spring retained tack fingers for supporting the tack until it is driven out from between them by the driver 11. When the slide 30 is in the right hand position, shown in Figure 1, it receives a tack from the passage 22, and when it is brought to the left hand position, shown in Figure 2, it carries the tack into the path of the driver, whereupon the driver acts to expel the tack from the tack holder, and drive it into the shoe, when a shoe is being presented to the machine.

The slide 30 operates the separator 16, doing so by means of a cam, which I have not shown in these drawings because it is a part of the previously existing machine, which wipes over an antifriction roll 32 carried by an arm 33 (see Figure 3) which is pivoted to the support 21 upon a pivot 34; and upon the same pivot is an arm 35 carrying a gear segment 36 which meshes with rack teeth on the rear side of the separator 16. The arm 33 is separate from the arm 35, and is provided at one side of the pivot 34 with a shoulder 38 which bears against an abutment surface on the side of the arm 35; while at the other side of the pivot it carries a plunger 39 movable in a socket 40 and pressed upon by a spring 41 which plunger bears against a finger 42 connected to the arm 35. A stiff spring 43 interposed between the arm 33 and an abutment 44 on the rigid part 21, normally holds the arms 33 and 35 in the position shown in Figure 3, in which the separator 16 is in the extreme left hand position where the hole 28 is in register with the passage 22. The pin 45 shown in Figure 3 is simply a guide for the spring 43 to prevent the latter from buckling. This pin has a ball and socket mounting on the abutment 44 at one of its ends, and its other end passes freely through a hole in the end of the arm 33. The spring 43 is the means which drives the separator when transferring a tack from the raceway to the passage 22. The retraction of the separator preparatory to making this transfer is caused by movement of the slide 30. In this movement the cam on the slide 30 which directly bears on the roll swings the arm 33 to its full movement, and normally would shift the separator to its fully retracted position; but since the means for thus moving the separator includes the yielding plunger 39, it is possible to arrest the separator before it has been retracted far enough to pick off a tack, without resulting in damage to any part of the machine. This condition is taken advantage of in carrying out the purposes of the present invention.

The parts and mechanisms thus far described are those already existing in commercial lasting machines of the type above noted, a further and complete description of which may be found in existing Letters Patent of the United States. The embodiment of the invention which I have chosen for explanation in this specification is adapted for attachment to such machine, and is as follows:

The rest 10 instead of being fixed in position, as in the commercial machine, is mounted upon a slide 46 which has a limited movement in a guideway 47 on the end of the bracket arm 9, as appears from a comparison of Figures 1 and 2, which respectively indicate the limits of this movement. A shoulder 48 on the slide limits the upward movement thereof by striking the lower edge of the guideway, while a lug 50 projecting through a notch 51 in the side of the guideway limits the downward movement of the slide. To the arm or lug 50 there is pivoted an arm 52 terminating in a hook 53 which is located in a plane at right angles to the length of arm 52, which hook receives and supports the swinging part of a lever 54 which is connected by a pivot 55 with a fulcrum plate 56 secured to the rigid machine frame by bolts 57 and 58. These bolts are provided as connecting parts in the commercial machine of the type to which I have referred, wherefore the mounting of the fulcrum provided for the lever 54 involves only the provision of a suitable plate, as the plate 56, adapted to be mounted upon these bolts and gripped against the sides of the frame part by the heads of the bolts or nuts screwed on the bolts. Preferably the holes in the plate 56 through which said bolts pass are wider in both dimensions than the bolt shanks, wherefore a certain range of adjustment is permitted both up and down and forward and backward.

There is pivoted between lugs 59 on the under side of the plate 18, a lever 60 having one arm turned up to pass through a slot 61 in the plate, its end terminating in a stop or abutment 62 in the path of the separator, such abutment being adapted when the lever is in the position shown in Figures 3, 4, and 5 by full lines, to arrest the separator before it has been withdrawn far enough to pick off a tack from the raceway by its picker point 26; and to be withdrawn out of the way of the separator when the lever 60 is put near the position shown in Figure 6, and by dotted lines in Figure 5. A link 63 is connected to this lever by a pivot pin 64 and to the lever 54 by a rod 65. One end of rod 65 passes through a boss 66 on the link 63, in which it is secured by a set screw 67, while its other end is formed as a hook and is passed through a hole 68 in the lever 54. A spring 69 between the plate 18 and lever 60 tends to hold stop 62 in its obstructing position, this being the position shown in Figures 3, 4, and 5, and to this tendency is added the weight of the lever 54 and of the link connection between the two levers. Evidently raising of lever 54 will withdraw the stop 62.

The same lever 54 controls a device for displacing the driver, this being in the construction here shown a loop or bail 70 which is U shaped and the ends of which have trunnions 71 occupying bearings in plates 72 which are secured upon opposite sides of the slide 30 by a bolt 73. One arm of this bail carries a finger 74 which projects over the lever 54, and is drawn toward said lever by a spring 75. The loop end of the bail is adapted to drop between a pusher or wedge block 76 on the slide 30 and a complemental surface 77 on the driver bar, or to be raised above the upper termination of the surface 77 opposite to a recess 78. If the slide 30 advances when the bail or displacer 70 is in the lowered position, it moves the driver out of the way, as shown by dotted lines in Figure 2, so that it can not enter the tack passage in the nail holder 31. But if the displacer 70 is raised when the slide 30 comes forward, the driver is left in position to pass through the said passage and eject the tack from the holder 31.

It will now be understood that when there is no shoe in place to receive tacks driven by the tacking mechanism, the lever 54 takes its lower position, whereby the separator stop 62 is placed to obstruct the separator and the displacer 70 is positioned to displace the driver. Thus even though the machine continues in operation, the driver is unable to eject the tack already in the holder 31. Also the separator is unable to feed any more tacks because it is stopped, every time the slide 30 moves forward, before it has been moved back far enough to pick off a tack on its next forward movement. But when the operator presents a shoe in position to be lasted, the upward pressure which he necessarily applies to the rest 10, in order to hold the shoe steady, causes said rest and the arm 52 to be raised, thereby raising lever 54 and withdrawing the stop 60 from the path of the separator or feeder, and the displacer 70 from between the parts 76 and 77. Then on each forward movement of the slide 30 the holder 31 is brought into the path of the driver, permitting the tack already in the holder to be driven, and the separator is retracted far enough to pick another tack from the raceway, and on the retraction of slide 30 the separator is carried forward, picking off a tack and transferring it to the passage 22, whence it drops into the holder 31 in readiness for the next stroke of the driver. When, after completion of the work on one shoe, the shoe is laid aside, the rest 10 drops to its lower position and the stop 60 and displacer 70 become again operative to prevent feeding or ejection of tacks. By this means waste of tacks is entirely prevented, whereas in the previous mode of operation of the machine without my attachment tacks are fed and ejected whenever the machine is run without there being a shoe in place to receive the tacks.

I would have it understood that the protection which I claim for this invention is not limited to an attachment to a lasting machine, or to the combination of the novel means and mechanisms, or equivalents thereof, which I have here shown with the associated parts of the lasting machine. On the contrary I claim protection for all equivalent embodiments of the invention here disclosed applied to all possible uses.

What I claim and desire to secure by Letters Patent is:—

1. In a machine for setting fastenings, the combination with a driver, a feeder, and a receiver to which fastenings are delivered by said feeder and from which they are adapted to be forced by said driver into a work-piece placed to receive them, of a displacer for shifting the driver out of its driving relation to said receiver when the receiver is positioned for the delivery of a fastening to the work, and means for rendering said displacer inoperative when a work-piece is presented to receive a fastening.

2. In a machine for setting fastenings, the combination with a movable feeder, a driver and means for operating them, of a stop for obstructing said feeder and a displacer for shifting the driver into a position wherein it is unable to act on a previously fed fastening.

3. The combination with a fastening inserting machine having a driver normally operating through a fastening holder, a feeder for feeding fastenings to said holder and means for operating them, a stop for obstructing the operation of said feeder, a displacer for shifting the driver so that on its operating movement it does not pass through said holder, and means controlled by the presentation of the article intended to receive the fastenings for making said stop and said displacer both inoperative.

4. In a fastening setting machine, the combination with a raceway, a feeder for transferring fastenings from said raceway, a holder having a passage to which the fastenings are so transferred and in which the fastenings are held until ejected, a driver for expelling fastenings from said holder and setting them in an article placed to receive them, and mechanism automatically operative for moving said feeder, holder, and driver in required sequence, of a stop arranged to limit the movement of the feeder to a degree in which it is ineffective to transfer fastenings, a displacer organized to shift the driver into a path at one side of the passage for the fastening in said holder and being itself displaceable from the location in which it does so, a rest against which said article is placed to receive fastenings, said rest being movable by the article when so placed, and connections by which said rest in its movement displaces said displacer into its inoperative location and moves said stop into inoperative position.

5. In a fastening driving machine, the combination with a holder for fastenings having a driving passage, a driver adapted to pass through said passage and expel therefrom a fastening held in the passage, a work rest adapted to steady an article placed to receive fastenings from said holder under the impulse of the driver, said rest being displaceable under pressure applied by the article so placed, and the driver being displaceable to a path beside that in which it ejects fastenings as set forth, displacing means arranged and operable to shift the driver into such path when no article is pressed against the rest, and connections operated by movement of the rest when thus pressed against for rendering inoperative said displacing means.

6. In a fastening driving mechanism, a driver adapted to reciprocate in a given path and being displaceable laterally out of said path, a fastening holder having a passage to receive fastenings and adapted for traverse of the driver to eject such fastenings therefrom, a carriage upon which said holder is mounted movable in a path which transfers the holder between a fastening-receiving position, in which its passage is at one side of the driver and a position in which such passage is in the normal path of the driver, a displacer carried by said carriage adapted to occupy different positions, in one of which it bears upon and displaces the driver as aforesaid, and in the other of which it passes without displacing the driver, a movable work rest, and connections controlled by said work rest for causing said displacer to be put in the second or the first position, respectively, according as an article to receive fastenings is pressed against said rest or is not pressed against it.

7. In a lasting machine, the combination with a reciprocative tack driver, a laterally movable carriage, and a tack holder having a channel movable therewith to bring said channel between a receiving position at one side of the path of the driver and a position in such path, the driver being displaceable out of said path, of a displacer carried by said carriage adapted to occupy a position in which it shifts the driver out of its normal path when the tack holder is brought into position for driving, a work rest against which the shoe to be lasted is held in position to receive tacks, said work rest being movable under the pressure applied by a shoe so held, and connections by which said rest when so moved shifts said displacer from the position specified into a different position wherein it clears, without displacing, the driver.

8. A tack driving mechanism comprising the combination with a tack holder, a tack driver, and a slide movable to shift said tack holder from a receiving position to a driving position in line with the driver, the driver, being adapted to be displaced from such line, of a displacer carried by the slide adapted to occupy a position in which it bears upon and displaces the driver at the same time that the holder is brought into the driving position; said displacer being movable into a location where it avoids the driver, an operating lever, a finger on said displacer overlying said lever and adapted to be engaged thereby, and a work rest connected to said lever and movable in a direction causing the lever to shift said displacer into the last named position.

9. A tack driving mechanism comprising the combination with a tack holder, a tack driver, and a slide movable to shift said tack holder from a receiving position to a driving position in line with the driver, the driver being adapted to be displaced from such line, of a displacer carried by the slide adapted to occupy a position in which it bears upon and displaces the driver at the same time that the holder is brought into the driving position, said displacer being movable into a location where it avoids the driver, a work rest movable under the pressure applied when a work piece is held against it in position to receive fastenings, and connections actuated by said rest when so moved for shifting the displacer into the last named position.

10. In a machine for setting fastenings, the combination with a driver, and means for feeding fastenings into the normal path of operation of said driver, of a stop for obstructing said feeding means, a displacer for shifting the driver so that in its operative movement it does not operate on a previously fed fastening and means controlled by presentation of an article intended to receive such fastenings for making said stop and said displacer both inoperative.

11. In a machine for setting fastenings, the combination of a raceway, a feeder, a fastening-setting driver, and means for operating them, a stop for obstructing said feeder, and a displacer for shifting the driver out of its driving path into a position wherein it is unable to act on a previously fed fastening.

12. In a machine for setting fastenings, the combination with a feeder, a fastening-setting driver, and means for operating them, of a stop for obstructing said feeder, means for rendering the stop inoperative as such, and a displacer for shifting the driver into a position wherein it is unable to act on a previously fed fastening.

13. In a machine for setting fastenings, the combination of a driver adapted to operate along a given path, means for feeding fastenings into said path, a stop for obstructing said feeding means, a displacer for shifting the driver out of said path, whereby it is unable to act on a previously fed fastening, and means controlled by presentation of an article intended to receive such fastening for making said stop and said displacer both inoperative.

14. In a fastening setting machine, a feeder for bringing fastenings into position to be driven, a driver arranged and operable to set the fastenings so positioned, mechanism for operating said feeder including a yielding connection adapted to yield when the feeder is obstructed, a pivotally mounted stop adapted to be placed across and withdrawn from the path in which said feeder moves, a controlling device against which work pieces are pressed when in position to receive fastenings, said controlling device being arranged and movable to occupy one position when so pressed upon by the workpiece, and to occupy a different position when there is no work-piece so placed, a pivoted lever engaged with said controller and movable thereby, and a link between said lever and said stop; the lever, stop and link being so arranged that when the controller is displaced by pressure of a workpiece the stop is withdrawn from the path of the feeder, and when the controller occupies the other of its above described positions the stop is interposed in the path of said feeder, whereby the operation of the latter is then prevented.

15. In a machine of the class described, the combination of tack-supplying mechanism including a tack holder for retaining a separated tack, tack-inserting mechanism, and means operated by power of the machine and rendered active by withdrawal of the work to cause the track-inserting mechanism to move in a path out of line with the separated tack in the holder so that the tack remains in position to be driven at the first stroke of the inserting mechanism after it is caused to assume its normal path by presentation to the work.

16. In a fastening-inserting machine, the combination with means for supplying separated, previously formed fastenings including a holder for retaining a separated fastening, reciprocating means for inserting the fastenings, means operating in each cycle when no work piece is presented to cause displacement of the inserting means without affecting its reciprocating movement so that the separated fastening is not driven but remains in the holder, and means responsive to presentation of the work piece for rendering the displacing means inoperative so that the fastening in the holder will be inserted by the first reciprocation of the inserting means after the work piece is presented.

17. In a fastening-inserting machine, the combination with means for separating individual fastenings, reciprocating means for holding a separated fastening and presenting it in position to be inserted, reciprocating means for inserting fastenings, and means responsive to presentation and withdrawal of the work piece to cause relative alteration of the paths of reciprocation of said two reciprocating means without affecting their reciprocating movement so that no fastening will be driven when no work piece is presented and a fastening will be inserted by the first reciprocation of the inserting means when a work piece is presented.

18. In a fastening inserting machine, the combination with means for supplying individual fastenings, a reciprocating instrument for inserting the fastenings, and means controlled by the presentation of the workpiece to render said instrument effective or ineffective by moving it laterally while it continues to reciprocate uninterruptedly.

19. In a machine of the class described, a plurality of instrumentalities operating in predetermined time relation, through repeated cycles, to separate and insert fastenings into a work-piece, power driven operating means therefor, and means operated therefrom for automatically rendering one of said instrumentalities functionless when no work-piece is presented to the machine and the machine continues to run.

20. In a machine of the class described, tack supplying mechanism, tack inserting means, power driven operating means therefor, and means operated therefrom adapted to be rendered operative by the absence of the work to prevent a tack from being expelled from the supplying mechanism.

21. In a machine of the class described, tack supplying mechanism, tack inserting means, power means moved in each cycle when the machine is running idle to prevent effective action of the inserting means, and means rendered effective upon presentation of the work to the machine to cause the said power means to become inoperative.

22. A machine of the class described having, in combination, tack supplying and inserting mechanism, power driven operating means therefor, means operated therefrom adapted to render said mechanism ineffective to insert tacks when no work is in position to receive them, and devices operated by the presentation of the work to render said means ineffective so that tacks will be inserted in the work.

23. A tacking machine having, in combination, tack feeding and driving mechanism arranged and operated to insert a plurality of tacks, in uninterrupted succession, one in each cycle, and power means operated in each cycle to render the driving mechanism ineffective to insert tacks when no work is presented to receive them, said power means being rendered inoperative to prevent insertion of tacks when work is presented to receive the tacks.

24. A machine of the class described having, in combination, tack supplying means, a reciprocating driver for inserting the tacks into a work-piece, power means automatically operative when the work-piece is withdrawn from the machine to displace the driver from its normal path of reciprocation.

25. A machine of the class described having, in combination, a tack separator, a tack carrier movable to carry a separated tack to driving position, a reciprocating driver arranged for movement to aline it with the tack in the carrier, means operated by the carrier to effect movement of the driver out of alinement with the tack in the carrier, and means responsive to contact with the work to control said carrier-operated driver-positioning means.

26. A machine of the class described having, in combination, a reciprocating driver for inserting the tacks, means for presenting tacks in position to be driven by the driver into work presented to the machine, and power means automatically operative when the work is withdrawn from the machine to cause the driver to reciprocate in a path different from its normal path to prevent waste of tacks until work is re-presented to the machine.

27. A machine of the class described having, in combination, a tack separator, a tack carrier movable to carry the separated tack to driving position, a reciprocating driver arranged for pivotal movement by the carrier to aline it with the tack in the carrier, means operated by the carrier to effect further movement of the driver out of alinement with the tack in the carrier, and means controlled by engagement with the work to move said carrier operated means out of operative position.

In testimony whereof I have affixed my signature.

DAVID MacARTHUR.